United States Patent
Hatley et al.

(10) Patent No.: US 6,462,455 B2
(45) Date of Patent: Oct. 8, 2002

(54) TURBINE GENERATOR STATOR ASSEMBLY HAVING A COMPACT INFLATABLE DEVICE FOR APPLYING LOCALIZED PRESSURE TO ARMATURE BARS

(75) Inventors: Kenneth John Hatley, Madison, NJ (US); Sean Michael McDonnell, Aberdeen, NJ (US); Alan Michael Iversen, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/988,608

(22) Filed: Nov. 20, 2001

(65) Prior Publication Data

US 2002/0067082 A1 Jun. 6, 2002

Related U.S. Application Data

(63) Continuation-in-part of application No. 09/730,475, filed on Dec. 6, 2000.

(51) Int. Cl.[7] ............................. H02K 3/48; H02K 1/00; H02K 17/00; H02K 19/00; H02K 21/00; H02K 23/26; H02K 27/02; H02K 3/04; H02K 15/00
(52) U.S. Cl. ...................... 310/214; 310/216; 310/201; 310/154.16; 29/732
(58) Field of Search .................. 310/214, 216, 310/154.16, 201; 92/92, 84, 142, 163

(56) References Cited

U.S. PATENT DOCUMENTS

| | | | | |
|---|---|---|---|---|
| 1,308,064 A | * | 7/1919 | Griffith | 310/214 |
| 1,316,798 A | * | 9/1919 | Lamme | 310/214 |
| 3,054,009 A | * | 9/1962 | Papst | 310/214 |
| 3,119,033 A | * | 1/1964 | Horsley et al. | 310/64 |
| 3,139,550 A | * | 6/1964 | Geer | 310/214 |
| 3,243,622 A | * | 3/1966 | Whittlesey | 310/214 |
| 3,624,432 A | * | 11/1971 | Merz | 310/53 |
| 3,628,238 A | * | 12/1971 | Hill | 29/596 |
| 3,662,604 A | * | 5/1972 | Low et al. | 73/421.5 R |
| 3,815,206 A | * | 6/1974 | Smith | 29/205 D |
| 3,818,571 A | * | 6/1974 | Arnold et al. | 29/205 R |
| 3,828,830 A | * | 8/1974 | Hill et al. | 140/1 |
| 3,831,641 A | * | 8/1974 | Schlaudroff et al. | 140/92.1 |
| 3,844,626 A | * | 10/1974 | Stelzer | 303/68 |
| 3,866,070 A | * | 2/1975 | Madsen | 310/214 |
| 3,898,491 A | * | 8/1975 | Long et al. | 310/183 |
| 3,909,931 A | * | 10/1975 | Lambrecth | 29/596 |
| 3,949,255 A | * | 4/1976 | Brown et al. | 310/214 |
| 4,037,312 A | * | 7/1977 | Deis | 29/598 |

(List continued on next page.)

FOREIGN PATENT DOCUMENTS

| | | | |
|---|---|---|---|
| FR | WO 98-53543 | * | 11/1998 |
| JP | 56-166738 | * | 12/1981 |
| JP | 04-229070 | * | 8/1992 |
| JP | 08-116638 | * | 5/1996 |
| JP | 09-117087 | * | 5/1997 |
| JP | 2001-211592 | * | 8/2001 |

Primary Examiner—Nestor Ramirez
Assistant Examiner—Pedro J. Cuevas
(74) Attorney, Agent, or Firm—Nixon & Vanderhye P.C.

(57) ABSTRACT

Radial pressure is applied to a turbine generator armature bar using a simple hand held device that can be readily manipulated by a single human operator. A retainer platform has two wedge shaped portions with handles, and by the operator sliding the wedge shaped portions with respect to each other the operative width of the platform may be adjusted, including to slide and lock the platform in a conventional dovetail slot in a stator. An inflatable bladder is positioned on or mounted to the top surface of the platform and is dimensioned so as to apply radial pressure (for example through a filler) to armature bars mounted in the stator. A conduit, preferably having a valve with quick-release actuator in it, extends from the inflatable bladder and connects to a source of gas under pressure.

7 Claims, 2 Drawing Sheets

U.S. PATENT DOCUMENTS

| | | | | |
|---|---|---|---|---|
| 4,117,362 A | * | 9/1978 | Tsirkin et al. | 310/214 |
| 4,163,166 A | * | 7/1979 | Kamiya et al. | 310/215 |
| 4,214,182 A | * | 7/1980 | Keim | 310/216 |
| 4,369,398 A | * | 1/1983 | Lowry, Sr. | 310/214 |
| 4,557,038 A | * | 12/1985 | Wcislo et al. | 39/596 |
| 4,572,980 A | | 2/1986 | Anderson et al. | 310/214 |
| 4,584,497 A | * | 4/1986 | Butman et al. | 310/214 |
| 4,751,868 A | * | 6/1988 | Paynter | 92/48 |
| 4,784,042 A | * | 11/1988 | Paynter | 91/534 |
| 5,053,663 A | * | 10/1991 | Boer et al. | 310/91 |
| 5,301,417 A | * | 4/1994 | Kawakami | 29/598 |
| 5,315,752 A | * | 5/1994 | Ohta et al. | 29/598 |
| 5,325,008 A | * | 6/1994 | Grant | 310/214 |
| 5,851,340 A | * | 12/1998 | Muller et al. | 156/293 |
| 6,065,204 A | * | 5/2000 | DeHart | 29/734 |
| 6,219,900 B1 | * | 4/2001 | Suzuki | 29/598 |
| 6,354,189 B1 | * | 3/2002 | Schmied et al. | 92/163 |

\* cited by examiner

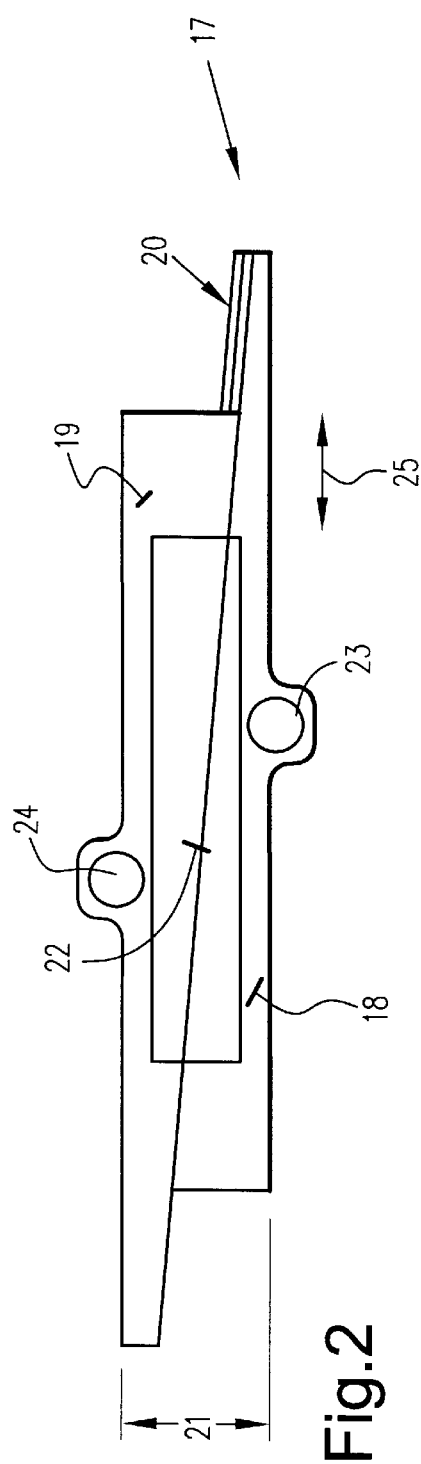
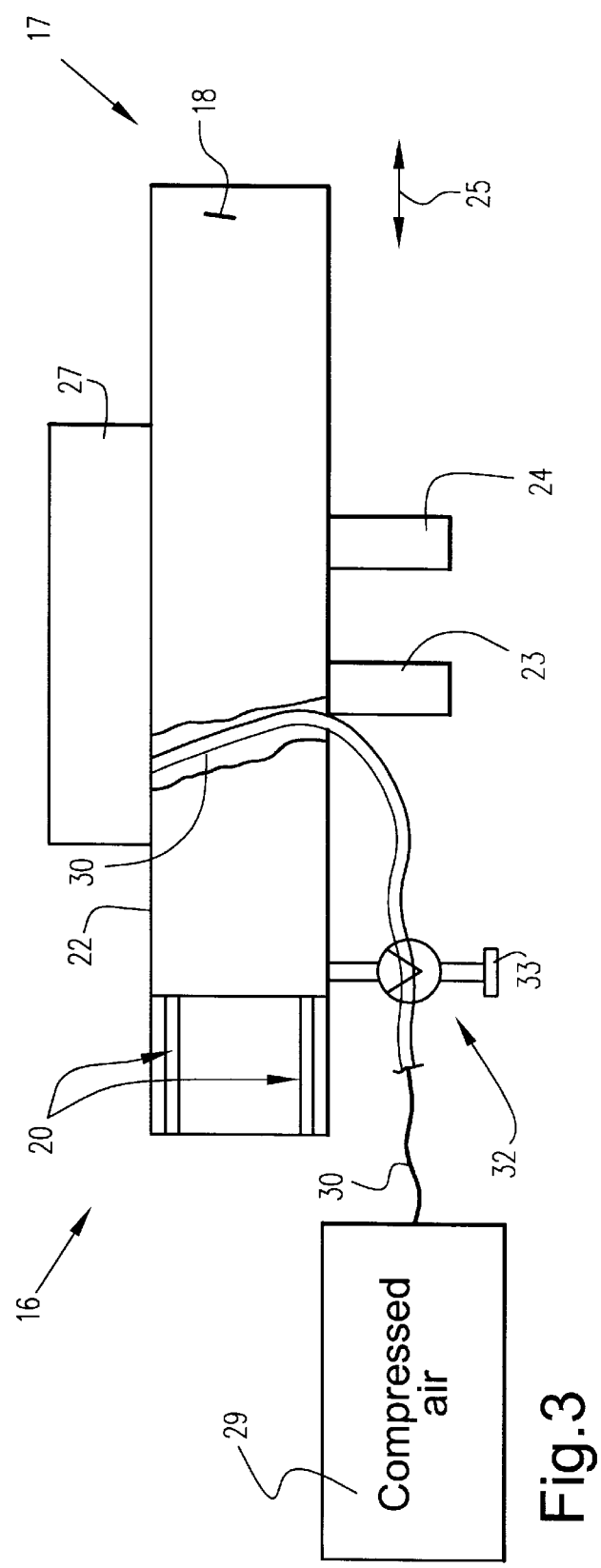

TURBINE GENERATOR STATOR ASSEMBLY HAVING A COMPACT INFLATABLE DEVICE FOR APPLYING LOCALIZED PRESSURE TO ARMATURE BARS

This application is a continuation-in-part of Application Ser. No. 09/730,475, filed Dec. 6, 2000, now pending, the entire content of which is hereby incorporated by reference in this application.

This invention relates to turbomachinery and specifically to the winding of generator stators.

BACKGROUND OF THE INVENTION

During the process of winding a generator stator (such as shown in U.S. Pat. No. 4,572,980, the disclosure of which is hereby incorporated by reference), there is a need at several points in the process to apply radial pressure to the armature winding elements, commonly referred to as armature bars, to firmly force the bars and other slot contents against the bottom of the stator core slot. The conventional device for applying the pressure is an expandable strut containing a hydraulic ram with jacking boards at both ends for distributing the applied force. The strut is positioned radially across the inside diameter of the stator core and the jacking boards are placed within two diametrically opposite slots. The hydraulic ram is pumped to a known pressure resulting in a pressure applied to the armature bar areas contacted by the jacking boards. The bar-jacking device is heavy, bulky, and cumbersome to use. Two operators are needed to set up and use the device. During use of the conventional device, access to the bore of the stator core is restricted due to the size and span of the device. The conventional device also holds the potential for leakage of the hydraulic fluid and contamination of the stator core and armature winding.

BRIEF SUMMARY OF THE INVENTION

According to the present invention a turbine generator armature bar pressure applicator, a turbine generator stator assembly, and a method of mounting armature bars in a turbine generator stator, are provided which are simple and easy to use. The applicator according to the invention is compact, hand-held, and lightweight (and hence portable), so that it can be used by a single operator during conventional winding or rewedging processes. The device also has no potential for contaminating the stator core and armature winding, or any accessory structures.

According to one aspect of the present invention there is provided a turbine generator armature bar pressure applicator, comprising: A retainer platform having first and second portions mounted to slide with respect to each other to adjust the operative width of the platform, and configured to slide in a dovetail slot in a stator for receipt of armature bars, the platform having a top surface. An inflatable bladder operatively associated with [for example mounted to, resting on, or in any other way associated with so that the desired functionality is provided] the top surface and dimensioned so as to apply radial pressure to armature bars mounted in a stator. And, a conduit extending from the inflatable bladder for supplying gas under pressure to the bladder to selectively inflate the bladder.

The applicator preferably further comprises a valve operatively connected to the conduit for selectively allowing pressurized gas to pass through the conduit into the bladder, or for venting pressurized gas from the bladder; preferably the valve may be a conventional valve that has a quick-release function, so that the bladder may be vented quickly. The inflatable bladder may comprise a wide variety of different structures. such as a flexible wall hose.

Typically the applicator further comprises at least one handle mounted to the platform opposite the top surface. Desirably the platform is dimensioned and constructed so as to be readily handled by a single person (e.g. a normal adult male). The platform typically comprises first and second portions that are generally wedge-shaped, and the at least one handle comprises first and second handles each substantially centrally located in first and second portions, respectively.

According to another aspect of the present invention a turbine generator stator assembly is provided, comprising: A turbine generator stator having a plurality of generally radially extending slots each with an access opening, and a dovetail slot in the stator adjacent the openings and extending generally perpendicular to the radial slots. A plurality of armature bars are inserted in at least one of the radial slots. An inflatable bladder operatively engaging the armature bar, the bladder operatively connectable to a source of gas under pressure. A hand held platform mounting the bladder and slidable in the dovetail slot. And, the bladder provided with gas under pressure to expand and apply radial pressure to the armature bars to press the armature bars into the radial slot. and the bladder vented to release gas under pressure from the bladder.

Typically there is at least one filler between the bladder and the armature bars. The bladder is typically operatively connected to a source of gas under pressure by a conduit, and the assembly further comprises a valve operatively connected to the conduit for selectively allowing pressurized gas to pass through the conduit into the bladder, or for venting pressurized gas from the bladder. The valve preferably comprises a quick-release valve. Typically there is at least one handle mounted to the platform opposite the top surface, and the inflatable bladder may comprise a flexible wall hose.

According to another aspect of the present invention there is provided a method of mounting armature bars in a turbine generator stator having a plurality of generally radially extending slots each with an access opening, and a dovetail slot in the stator adjacent the openings and extending generally along the radial slots, and using an inflatable bladder on a hand held platform, the method comprising, substantially sequentially: (a) Inserting an armature bar in one of the radial slots through the access opening. (b) Moving the inflatable bladder into operative engagement with the armature bars, including by moving the platform in the dovetail slot. (c) Supplying gas under pressure to the bladder to expand the bladder and apply radial pressure to the armature bars to press the armature bars into the radial slot through the access opening. (d) Venting gas under pressure from the bladder so that the bladder is no longer in operative engagement with the armature bar.

Preferably the platform comprises first and second wedge-shaped portions slidable with respect to each other to adjust the effective width thereof and each portion having at least one handle; and in the method preferably (b) is practiced by manually moving the portions with respect to each other by engaging the handles so that the platform is of a width that will slide in the dovetail slot until the bladder is aligned with the armature bar; and then manually moving the handles with respect to each other to cause the platform to have a width that causes the platform to be substantially wedged in a stationary position in the dovetail slot. The method also preferably further comprises, between (a) and (c), inserting at least one filler between the bladder and the armature bar. Desirably the inflatable bladder has a quick-release valve operatively associated therewith. and (d) is practiced by manually actuating the quick-release valve. In the method, (c) may be practiced to supply gas under a pressure of about 80–20 (e.g. about 100) psi to the inflatable bladder.

BRIEF DESCRIPTION OF THE DRAWINGS

FIG. 2 is a top plan view of the platform (only) of the applicator of FIG. 1; and FIG. 3 is a side schematic view, with portions of the platform cut away for clarity of illustration, of the applicator of FIGS. 1 and 2 with the inflatable bladder inflated.

DETAILED DESCRIPTION OF THE INVENTION

Figure 1:
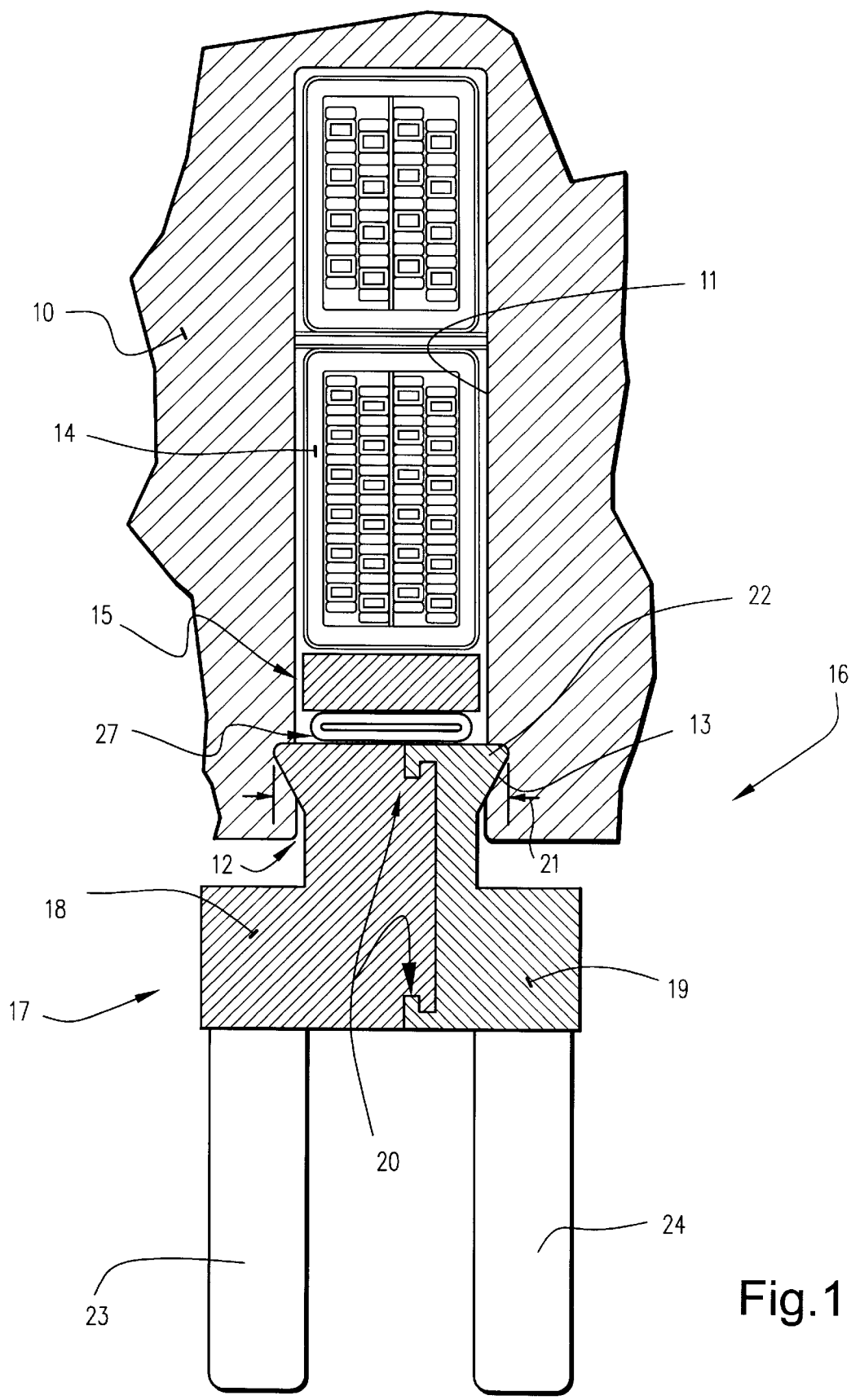
FIG. 1 is a detail side view, partly in cross-section and partly in elevation, of one form of an applicator according to the present invention shown mounted in association with a turbine generator stator so as to apply radial pre sure to an armature bar in the stator.

FIG. 1 illustrates an exemplary turbine generator stator core 10 (such as shown in U.S. Pat. No. 4,572,980) having a plurality of radially extending slots 11 each with an access opening 12 (see FIG. 4) and dovetail slot 13 adjacent the openings 12 and extending generally along the slots 11. Armature bars 14 are typically mounted in each of the bores 11, typically, although not necessarily, with one or more filler elements 15 at the opening 12. According to the present invention a simple turbine generator armature bar pressure applicator 17 is provided which can be utilized to simply, easily, and effectively, apply the desired radial pressure to the armature bars 14.

The applicator 17, in the preferred embodiment illustrated in the drawings, a platform 16 which in turn comprises first and second body portions 18, 19 which are preferably substantially wedge-shaped (see FIG. 2) and mounted together, using any suitable groves, channels, or surface manifestations, such as shown schematically at 20 in FIGS. 1 through 3, to adjust the operative width 21 thereof (see FIG. 1). The platform 16, and specifically the ends of the components 18, 19 are configured to slide in the dovetail slot 13, and has a top surface 22.

While other configurations may be provided, the platform 16 may have at least one handle 23, 24 extending downwardly from a substantially central portion of each of the sections 18, 19, respectively so that a single human operator may grasp the handles 23, 24 and move them with respect to each other in the direction of elongation of the platform—indicated by the arrows 25 in FIGS. 2 and 3—to effect the relative sliding action, and width adjustment.

An inflatable bladder, such as the flexible wall hose 27 illustrated in FIGS. 1 and 3, is operatively associated with the top surface 22 of platform 16. The operative association may be by a wide variety of different methods. For example the hose 27 could be fixed by adhesive, mechanical fasteners (with appropriate sealing), or like devices to one of the sections 18, 19; or it may be loosely laid on top of the surface 22; or it may be associated with the surface 22 in any other suitable manner, as long as the bladder 27 may be operated so as to apply a radial pressure to the armature bars 14. FIG. 1 shows the hose 27 in a collapsed condition, whereas FIG. 3 shows the hose 27 in an expanded condition. That is, FIG. 1 shows the hose 27 after venting, and FIG. 3 shows the hose 27 when pressurized with compressed gas (e.g. air) from a conventional source 29 (see FIG. 3) of compressed air.

Typically a conduit—such as a flexible conduit—shown schematically at 30 in FIG. 3—extends between the bladder 27 and the source of compressed gas 29. The conduit 30 may extend through one of the sections (e.g. the section 18 as seen in FIG. 3) of the platform 16 out through the bottom thereof, so that the conduit 30 does not interfere with the movement of the platform 16 in the dovetail slot 13, or the radial movement of the bladder 27.

In order to selectively control supply of compressed gas under pressure (e.g. between about 80–120 psi, preferably about 100 psi) from the source 29 to the bladder 27, a conventional valve 32 (see FIG. 3) may be provided. The valve 32 may be mounted to the bottom of one of the sections (e.g. section 18 in FIG. 3) of the platform 16, and preferably is a valve that has three positions, a first position in which gas under pressure flows from the source 29 to the bladder 27 to inflate it, a second position in which gas is vented from the bladder 27 to atmosphere (or a recovery tank), and a third position in which the valve 32 is closed and gas does not move into or out of the bladder 27. While a wide variety of conventional valves 32 for that purpose may be utilized, preferably the valve 32 includes a manual actuator 33 of the "quick-release" type so that when the actuator 33 is manually actuated the pressurized gas quickly vents from the bladder 27, and when the actuator 33 is released, the bladder 27 is in a position awaiting the next connection to the source of compressed gas 29.

In the practice of an exemplary method according to the present invention, armature bars 14 are inserted into a slot 11 in the stator core 10 through the access opening 12, and if desired a filler 15 is also inserted. The inflatable bladder 27 is moved into operative engagement with the armature bars 14 (e.g. into a position abutting one or more fillers 15, or simply underlying the armature bars 14), including by moving the platform 16 in the dovetail slot 13 when the handles 23. 24 have been moved to a position where the width 21 is slightly less than the normal width of the dovetail slot 13. When the bladder 27 is in proper alignment with the armature bars 14 then the handles 23, 24 are grasped so as to move the sections 18, 19 so that the width 21 is substantially the same as the width of the slot 13, and so that the platform 16 is substantially wedged in a stationary position in the dovetail slot 13. Then gas is supplied under pressure to the bladder 27, such as by manually actuating the valve 32 to allow compressed air to flow from the source 29 to the bladder 27 through the conduit 30, and the gas under pressure expands the bladder 27 so that it applies a radial pressure to the armature bar 14 to press the armature bars 14 into the bore 15 through the access opening 12. After the appropriate pressure (e.g. about 100 psi) has been applied, then the gas is vented from the bladder 27 (for example by manually actuating the quick-release actuator 33 of the valve 32) so that the bladder 27 is no longer in operative engagement with the armature bars 14. Then the above procedures are repeated for at least one additional pair of armature bars 14.

It will thus be seen that according to the present invention a simple yet effective turbine generator armature bar pressure applicator has been provided, eminently suited for use in a turbine generator stator assembly, and in a method of mounting armature bars in a turbine generator stator. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A combination turbine generator stator assembly and armature bar pressure applicator comprising:

a turbine generator stator having a plurality of generally radially extending slots each with an access opening, and a dovetail slot in said stator adjacent said openings and extending generally along said slots:

a plurality of armature bars in at least one of said radial slots;

a portable armature bar pressure applicator for use in installing the armature bars in said at least one of said slots, the applicator comprising an inflatable bladder operatively engaging one of said armature bars, said bladder operatively connectable to a source of gas under pressure;

a hand held platform slidable in the dovetail slot, said platform having first and second portions mounted to slide with respect to each other to adjust an operative width of said platform, said platform having a top surface mounting said inflatable bladder; and wherein, in use, said bladder is supplied with gas under pressure to expand and apply radial pressure to said armature bars to press said armature bars into said radial slot, and said bladder is vented to release gas under pressure from said bladder.

2. The combination as recited in claim 1 further comprising at least one filler between said bladder and said armature bars.

3. The combination as recited in claim 2 wherein said bladder is operatively connected to a source of gas under pressure by a conduit.

4. The combination as recited in claim 3 further comprising a valve operatively connected to said conduit for selectively allowing pressurized gas to pass through said conduit into said bladder, or for venting pressurized gas from said bladder.

5. The combination as recited in claim 4 wherein said valve has a quick-release actuator.

6. The combination as recited in claim 5 further comprising at least one handle mounted to said platform.

7. The combination as recited in claim 6 wherein said inflatable bladder comprises a flexible wall hose.

* * * * *

UNITED STATES PATENT AND TRADEMARK OFFICE
CERTIFICATE OF CORRECTION

PATENT NO.     : 6,462,455 B2
DATED          : October 8, 2002
INVENTOR(S)    : Hatley et al.

It is certified that error appears in the above-identified patent and that said Letters Patent is hereby corrected as shown below:

Column 3,
Line 6, delete "80-20" and insert -- 80-120 --; and
Line 13, delete "pre sure" and insert -- pressure --.

Signed and Sealed this

Twenty-eighth Day of January, 2003

JAMES E. ROGAN
*Director of the United States Patent and Trademark Office*